(12) United States Patent
Lindsey et al.

(10) Patent No.: US 11,329,404 B2
(45) Date of Patent: May 10, 2022

(54) POST INSULATOR KEEPER

(71) Applicant: LINDSEY MANUFACTURING CO., Azusa, CA (US)

(72) Inventors: Keith E. Lindsey, La Canada, CA (US); Paul Lara, Whittier, CA (US); Philip E. Spillane, Torrance, CA (US)

(73) Assignee: LINDSEY MANUFACTURING CO., Azusa, CA (US)

( * ) Notice: Subject to any disclaimer, the term of this patent is extended or adjusted under 35 U.S.C. 154(b) by 175 days.

(21) Appl. No.: 16/251,026

(22) Filed: Jan. 17, 2019

(65) Prior Publication Data

US 2019/0229442 A1     Jul. 25, 2019

Related U.S. Application Data

(60) Provisional application No. 62/734,180, filed on Sep. 20, 2018, provisional application No. 62/619,629, filed on Jan. 19, 2018.

(51) Int. Cl.
| | |
|---|---|
| *H01R 4/00* | (2006.01) |
| *H01R 4/58* | (2006.01) |
| *H01B 17/14* | (2006.01) |
| *H02G 7/05* | (2006.01) |
| *H01R 4/30* | (2006.01) |
| *H01R 43/00* | (2006.01) |
| *H01B 17/16* | (2006.01) |

(52) U.S. Cl.
CPC .............. *H01R 4/58* (2013.01); *H01B 17/14* (2013.01); *H01B 17/16* (2013.01); *H01R 4/305* (2013.01); *H01R 4/308* (2013.01); *H01R 43/00* (2013.01); *H02G 7/05* (2013.01)

(58) Field of Classification Search
CPC .......... H01R 4/58; H01R 4/305; H01R 4/308; H01R 43/00; H01B 17/14; H01B 17/16; H02G 7/05
See application file for complete search history.

(56) References Cited

U.S. PATENT DOCUMENTS

| | | | |
|---|---|---|---|
| 3,437,742 A | 4/1969 | Lindsey | |
| 4,402,540 A * | 9/1983 | Willem | H01B 17/22 294/174 |
| 4,434,978 A * | 3/1984 | Kloster | B25B 1/04 269/101 |
| 4,579,306 A * | 4/1986 | Kellett | F16L 3/1075 174/169 |

(Continued)

OTHER PUBLICATIONS

International Search Report with Written Opinion from corresponding International Patent Application No. PCT/US2019/014088, International Search Report with Written Opinion dated Mar. 26, 2019 (7 pgs.).

(Continued)

*Primary Examiner* — Pete T Lee
(74) *Attorney, Agent, or Firm* — Lewis Roca Rothgerber Christie LLP (57) ABSTRACT

A post insulator, a post insulator keeper, and a method of securing a conductor on a post insulator are provided. A post insulator includes: an electrically insulative case including an abutment surface defining a recess; and a keeper rotatably coupled to the case between an open position in which a conductor is receivable into the recess, and a closed position to maintain the conductor in the recess.

20 Claims, 8 Drawing Sheets

(56) References Cited

U.S. PATENT DOCUMENTS

| | | | | |
|---|---|---|---|---|
| 5,933,924 A | * | 8/1999 | Nowlen | H01B 17/16 |
| | | | | 24/132 R |
| 10,134,509 B1 | * | 11/2018 | Pyron | H02G 3/0456 |
| 2008/0083555 A1 | | 4/2008 | Kim | |
| 2013/0032379 A1 | | 2/2013 | Baker et al. | |

OTHER PUBLICATIONS

Canada Office Action for corresponding Canada Patent Application No. 3,088,975, Canada Office Action dated Aug. 3, 2021 (4 pgs.).

* cited by examiner

POST INSULATOR KEEPER

CROSS-REFERENCE TO RELATED APPLICATIONS

This application claims the benefit of each of U.S. Provisional Patent Application Ser. No. 62/619,629, filed on Jan. 19, 2018, and U.S. Provisional Patent Application Ser. No. 62/734,180, filed on Sep. 20, 2018, the entire disclosures of both of which are hereby incorporated by reference.

FIELD

Aspects of embodiments of the present invention relate to a post insulator, a post insulator keeper, and a method of securing a conductor on a post insulator.

BACKGROUND

A post insulator functions as a mechanical support between a transmission line and an electrical pole or tower while electrically insulating the transmission line from the pole or tower. For example, the post insulator may be mountable on a crossarm of an electrical pole and may be made of a ceramic or other suitable electrically insulative material. The transmission line, or conductor, may be supported on the post insulator by any of various devices, such as via bus bars, clamps, a tube-type support, or a multicore-style support.

For various reasons, it may be desirable to obtain measurements of voltage and/or current of a conductor supported by a post insulator. As such, a sensor may be provided in a post insulator for measuring at least one of a voltage or a current. In a multicore-style support, for example, a keeper may contact and secure a conductor on a post insulator. However, when the keeper makes contact with the conductor, a sensor may be energized, and there may be a danger of explosion. As such, there is a risk of bodily injury to a worker installing a conductor to a post insulator.

SUMMARY

According to an aspect of embodiments of the present invention, a post insulator keeper includes an eyelet which may be easily engaged by a hot stick or similar tool or device to quickly rotate the post insulator keeper and secure a conductor on a post insulator having the post insulator keeper.

According to another aspect of embodiments of the present invention, a post insulator keeper may be engaged to a conductor to secure the conductor on a post insulator while a worker is at a safe distance away from the post insulator.

According to one or more embodiments of the present invention, a post insulator includes: an electrically insulative case including an abutment surface defining a recess; and a keeper rotatably coupled to the case between an open position in which a conductor is receivable into the recess, and a closed position to maintain the conductor in the recess.

The keeper may include an eyelet configured to receive a tool to rotate the keeper between the open position and the closed position.

The keeper may include a connection opening defining a rotation axis about which the keeper is rotatably mounted to the case. The connection opening may be defined by inclined surfaces at upper and lower portions thereof, the inclined surfaces being inclined relative to a longitudinal axis of the connection opening. The keeper may include an eyelet configured to receive a tool to rotate the keeper between the open position and the closed position, the eyelet being spaced apart from the connection opening.

The keeper may be rotatably coupled to the case about a rotation axis, and the recess may be a U-shaped recess having two sides extending in a same direction as the rotation axis.

The keeper may include a clamping surface facing the abutment surface when the keeper is in the closed position, the clamping surface having a radius of curvature to be in surface contact with a conductor in the recess.

The case may include a connection fastener, and the keeper may include a connection groove, and, in the closed position, the connection fastener may be received in the connection groove.

The connection fastener may be configured to apply a force against the keeper in a direction toward the abutment surface to secure a conductor against the abutment surface via the clamping surface. The keeper may further include a recess surrounding the connection groove, the connection fastener being receivable in the recess to secure the conductor.

The keeper may include a first clamping surface facing a first direction and having a first curvature size, and a second clamping surface facing a second direction opposite the first direction and having a second curvature size different than the first curvature size, and the keeper may be removably mounted to the case such that either the first clamping surface or the second clamping surface is arrangeable to face the abutment surface based on a size of a conductor to be received in the recess.

According to one or more embodiments of the present invention, a method of securing a conductor on a post insulator including an electrically insulative case and a keeper rotatably coupled to the case between an open position and a closed position includes: inserting the conductor into a recess of the case with the keeper in the open position; and rotating the keeper from the open position to the closed position to maintain the conductor in the recess.

The keeper may be rotatably mounted to the case through a connection opening of the keeper, the connection opening defining a rotation axis, and rotating the keeper may include rotating the keeper about the rotation axis from the open position to the closed position.

The keeper may include an eyelet, and rotating the keeper may include inserting a tool into the eyelet and applying a rotation force to the keeper using the tool.

The method may further include clamping the conductor against an abutment surface of the case, the abutment surface defining at least one side of the recess.

Clamping the conductor may include forcing a clamping surface of the keeper into surface contact against the conductor, the clamping surface being opposite the abutment surface.

The case may include a connection fastener, and the keeper may include a connection groove, and, in the closed position, the connection fastener may be received in the connection groove.

Forcing the clamping surface of the keeper into surface contact against the conductor may include applying a force against the keeper in a direction toward the abutment surface via the connection fastener.

Rotating the keeper may include rotating the keeper using a hot stick while the conductor is energized.

The keeper may include a plurality of clamping surfaces having different curvature sizes, and the method may further include arranging the keeper such that a first clamping surface of the plurality of clamping surfaces faces the conductor, the curvature size of the first clamping surface corresponding to a size of the conductor.

BRIEF DESCRIPTION OF THE DRAWINGS

The above and other features, aspects, and advantages of the present invention will become better understood with regard to the following description and accompanying drawings where.

DETAILED DESCRIPTION

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive.

Figure 1:
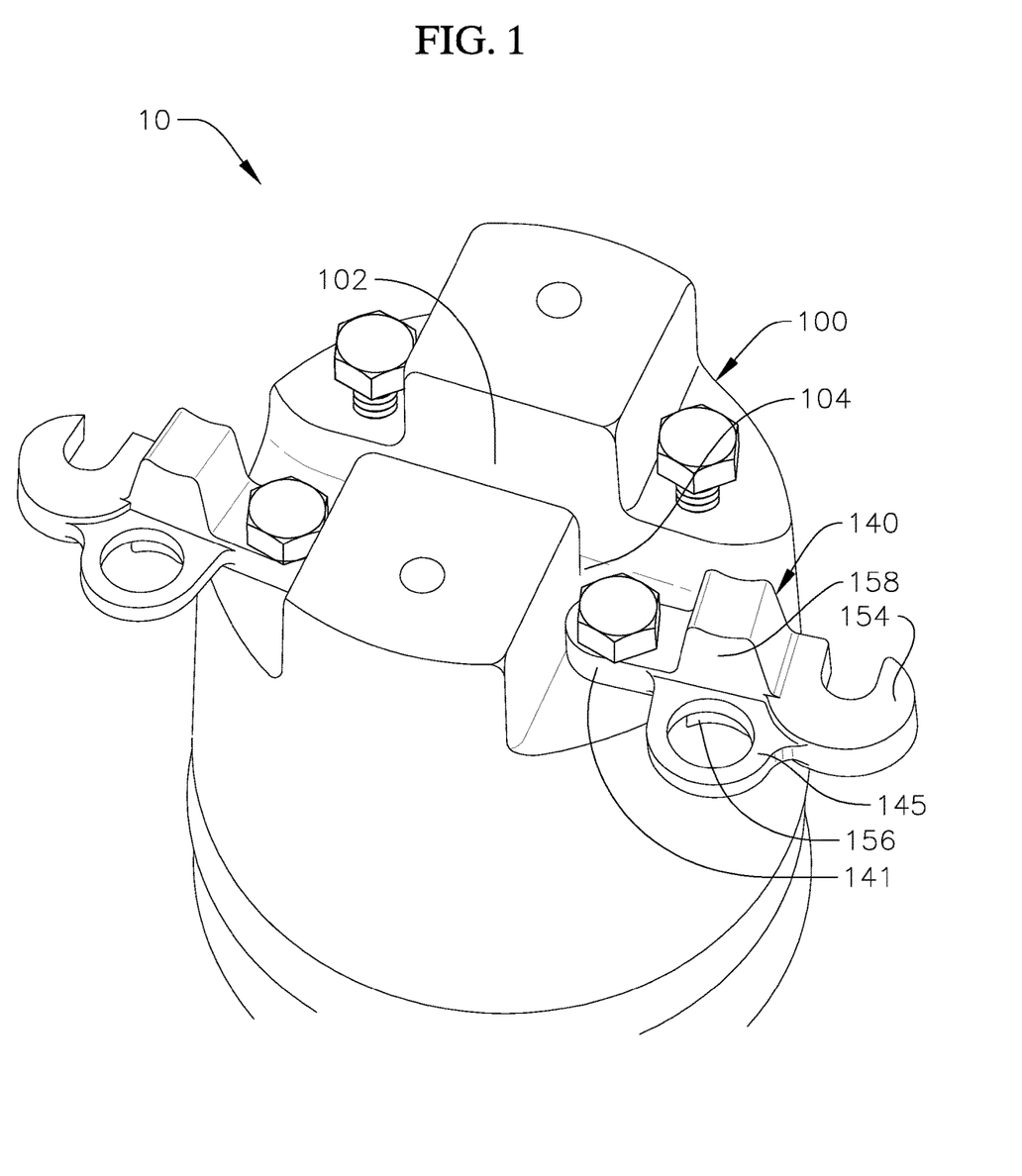
FIG. 1 is a partial perspective view of a post insulator showing a post insulator keeper of the post insulator in an open position, according to an embodiment of the present invention.
Figure 2:
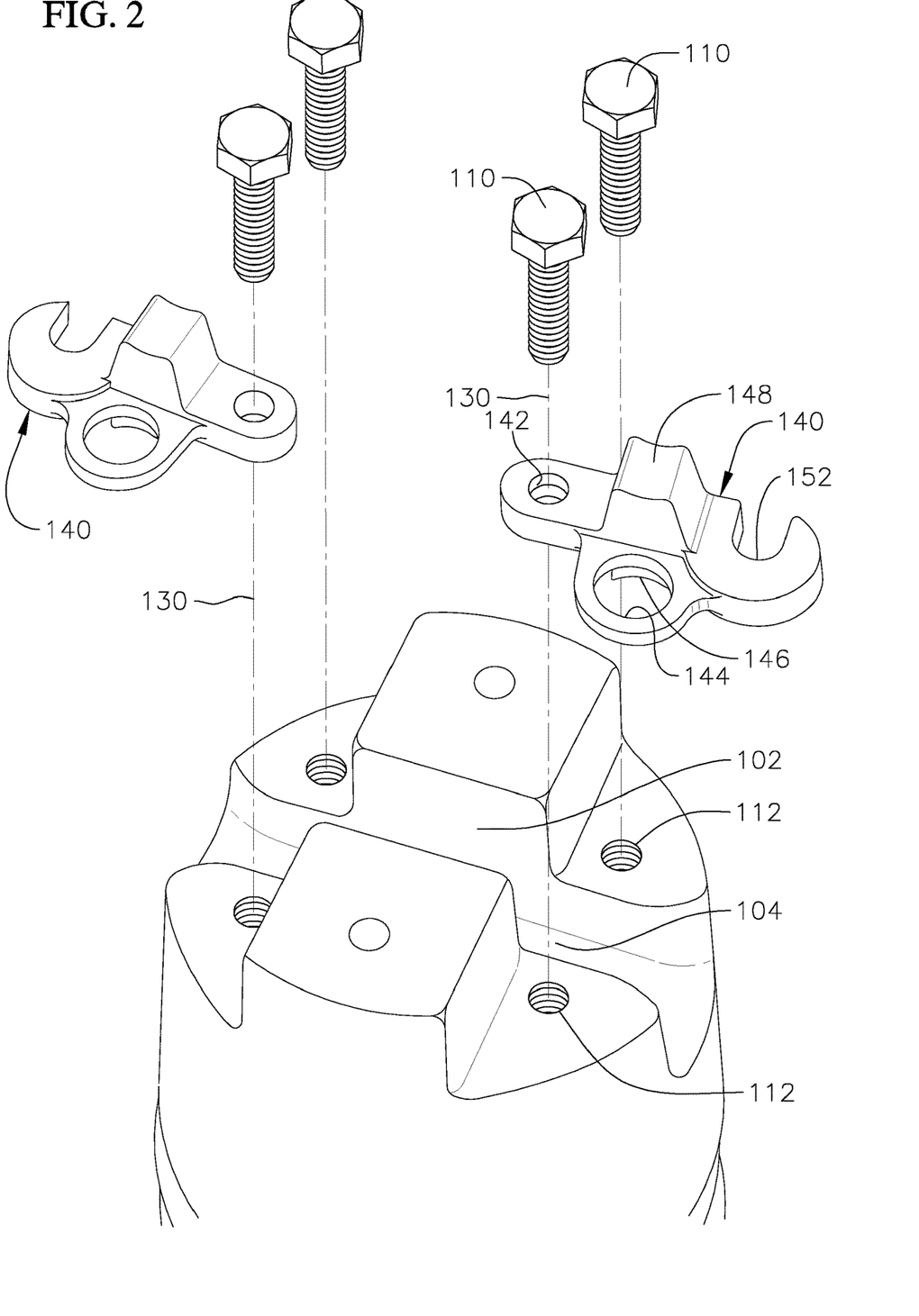
FIG. 2 is a partial exploded view of the post insulator of FIG. 1.

FIG. 1 is a partial perspective view of a post insulator showing a post insulator keeper of the post insulator in an open position, according to an embodiment of the present invention; and FIG. 2 is a partial exploded view of the post insulator of FIG. 1. With reference to FIGS. 1 and 2, a post insulator 10 includes an electrically insulative case 100 which may be configured to be mounted on a crossarm of a transmission line pole or tower, for example. In an embodiment, the post insulator 10 may include one or more sensors (not shown) housed in the case 100 and configured to sense information of at least one of a current and a voltage of a conductor 20 (see FIG. 4) that is supported by the post insulator 10.

The post insulator 10, according to an embodiment, may be a multicore-style insulator having a recess 102 into which the conductor 20 may be received. That is, an upper region of the case 100 may be shaped when viewed from a first side to define the recess 102 that extends from the first side to an opposite side. As such, the conductor 20 may be lifted into the recess 102 and supported by the post insulator 10 without being cut or requiring a jumper.

In an embodiment, the recess 102 may be defined by an abutment surface 104 of the case 100. In an embodiment, for example, the recess 102 may be U-shaped or otherwise concave, and the abutment surface 104 may correspondingly be U-shaped or otherwise concave to define a bottom and sides of the recess 102. The conductor 20 may be secured against the abutment surface 104, such as against a lower region of the abutment surface defining a bottom of the U-shape. However, embodiments of the present invention are not limited thereto, and, in other embodiments, the recess 102 and the abutment surface 104 may have any other suitable shape for securing the conductor 20.

The post insulator 10 may further include a plurality of fasteners 110. The fasteners 110 may be received in case openings 112 and, in an embodiment, the fasteners 110 may be threaded fasteners and the case openings 112 may be threaded holes. In an embodiment, a pair of the fasteners 110 may be arranged at opposite sides of the recess 102 at a first side of the case 100, and another pair of the fasteners 110 may be arranged at opposite sides of the recess 102 at a second side of the case 100.

The post insulator 10 further includes a keeper 140 configured to maintain the conductor 20 in the recess 102. In an embodiment, the keeper 140 presses or clamps the conductor 20 against the abutment surface 104. The keeper 140 is rotatable relative to the recess 102 between an open position (see FIG. 1) in which the conductor 20 is receivable into the recess 102 and a closed position (see FIG. 3) in which the conductor 20 may be held in the recess 102 by the keeper 140, as illustrated in FIG. 4. The keeper 140 is rotatable about a rotation axis 130. In an embodiment, the keeper 140 may be rotated by about 90 degrees from the open position to the closed position, as depicted in the drawings. However, the present invention is not limited thereto, and the keeper 140 may be rotated by an angle greater than 90 degrees to the closed position. In an embodiment, the keeper 140 is made of a metal and is electrically connected to the conductor 20.

The post insulator 10 includes a keeper 140 rotatably mounted to the case 100. In an embodiment, the post insulator 10 includes a pair of the keepers 140 rotatably mounted at opposite sides of the case 100. In an embodiment, one of the pair of keepers 140 may be rotatable in a clockwise direction between the open position and the closed position, and the other of the pair of keepers 140 may be rotatable in a counterclockwise direction between the open position and the closed position. As such, each of the pair of keepers 140 may be at the same side of the post insulator 10 while in the open position and may be more easily accessed to be moved to the closed position using a hot stick or other suitable tool, as described further below. However, the present invention is not limited thereto, and, in another embodiment, each of the pair of keepers 140 may be rotated in the same direction to the closed position.

With reference to FIG. 2, in an embodiment, the keeper 140 includes a connection opening 142 through which the keeper 140 may be connected to the case 100. In an embodiment, one of the fasteners 110 may be inserted through the connection opening 142 and fastened to the case 100 to rotatably mount the keeper 140 on the case 100. The connection opening 142 may also define the rotation axis 130 about which the keeper 140 is rotatable between the open position and the closed position. The keeper 140 may include a base portion 141 through which the connection opening 142 passes.

As illustrated in FIG. 2, in an embodiment, the keeper 140 further includes an eyelet 144. The eyelet 144 is an opening in which a tool, such as a hot stick, may be inserted by a worker to rotate the keeper 140 between the open position and the closed position. The eyelet 144 is spaced apart from the connection opening 142, such as along a direction transverse to the rotation axis 130. The eyelet 144 may be formed in a protrusion 145 of the keeper 140, and the protrusion 145 may protrude away from the base portion 141 in a direction away from the recess 102 when the keeper 140 is in the open position.

The keeper 140 further includes a clamping surface 146 configured to clamp the conductor 20 against the abutment surface 104. The clamping surface 146 may be concave with a radius of curvature. In an embodiment, the keeper 140 has the clamping surface 146 facing away from a first side (e.g., a lower side) of the keeper 140, and another clamping surface 148 facing away from a second side (e.g., an upper side) of the keeper 140 and having a radius of curvature different from that of the clamping surface 146. As such, the keeper 140 may be selectively oriented on the case 100 based on a size of the conductor 20 such that one of the clamping surfaces 146 and 148 faces the conductor 20 in the recess 102 to be in surface contact with the conductor 20. In an embodiment, the keeper 140 includes a first protrusion 156 protruding away from the base portion 141 toward the first side (e.g., the lower side) and having the clamping surface 146, and a second protrusion 158 protruding away from the base portion 141 toward the second side (e.g., the upper side) and having the clamping surface 148.

In an embodiment, the keeper 140 further includes a connection groove 152 and a hook portion 154 defining the connection groove 152. The connection groove 152 and the hook portion 154 are at a side of the keeper 140 opposite the base portion 141, such that when the keeper 140 is in the closed position, the base portion 141 and the connection opening 142 are at a first side of the recess 102, the connection groove 152 and the hook portion 154 are at an opposite side of the recess 102, and the clamping surface 146 overlaps the recess 102. In an embodiment, the connection groove 152 receives the fastener 110 at the side of the recess 102 opposite the connection opening 142 when the keeper 140 is in the closed position.

Figure 3:
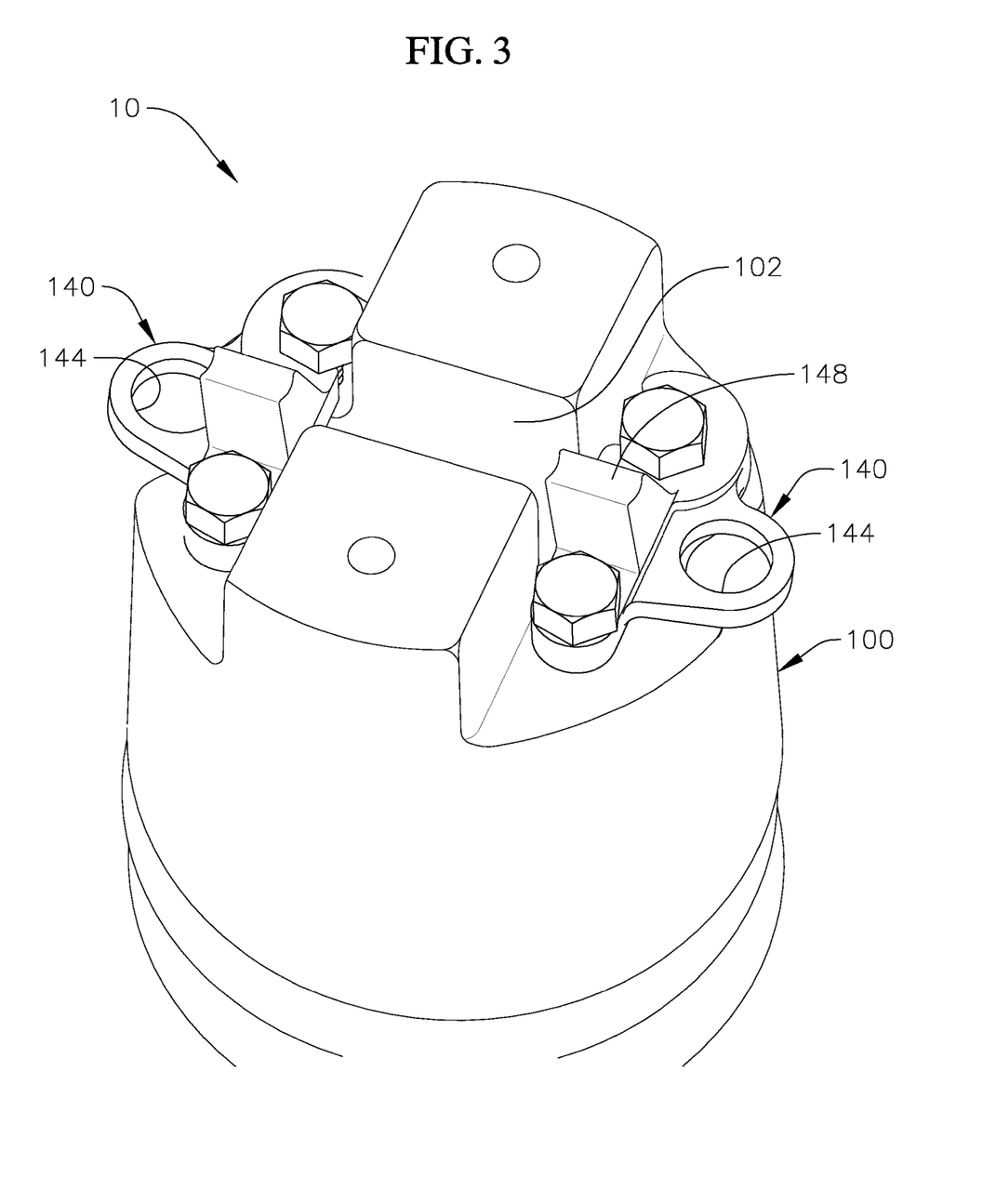
FIG. 3 is a partial perspective view of the post insulator of FIG. 1, showing the post insulator keeper in a closed position.
Figure 4:
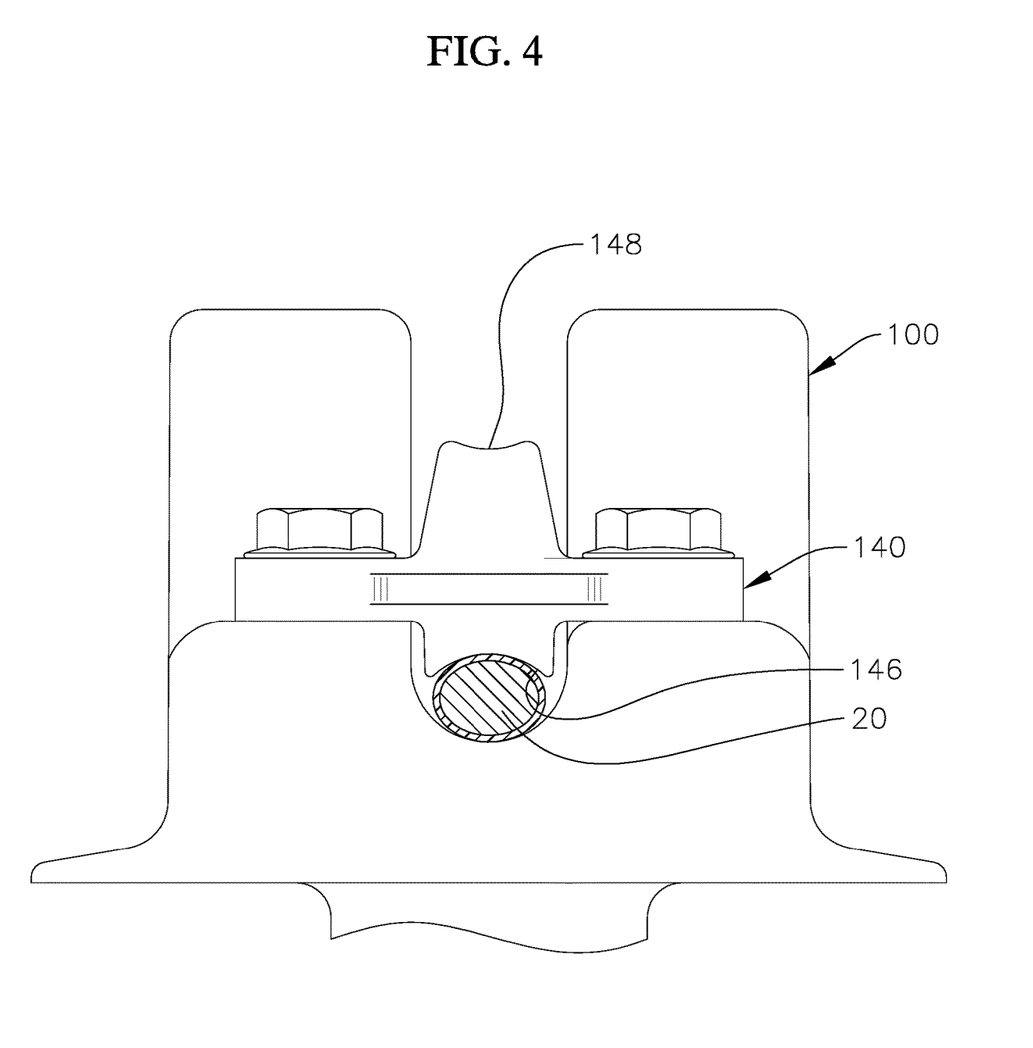
FIG. 4 is a side view of the post insulator of FIG. 3, showing the post insulator keeper in the closed position and a conductor being secured therewith.

FIG. 3 is a partial perspective view of the post insulator 10, showing the keeper 140 in a closed position; and FIG. 4 is a side view of the post insulator 10, showing the keeper 140 in the closed position and the conductor 20 being secured therewith. With reference to FIGS. 3 and 4, the keeper 140 is shown in the closed position that is rotated about the axis of rotation 130 with respect to the open position as described above. Furthermore, in FIG. 4, the conductor 20 is shown being secured between the clamping surface 146 and the abutment surface 104 of the case 100 defining a bottom of the recess 102. In the closed position, the connection groove 152 receives the fastener 110 at the side of the recess 102 opposite the rotation axis 130.

Figure 5:
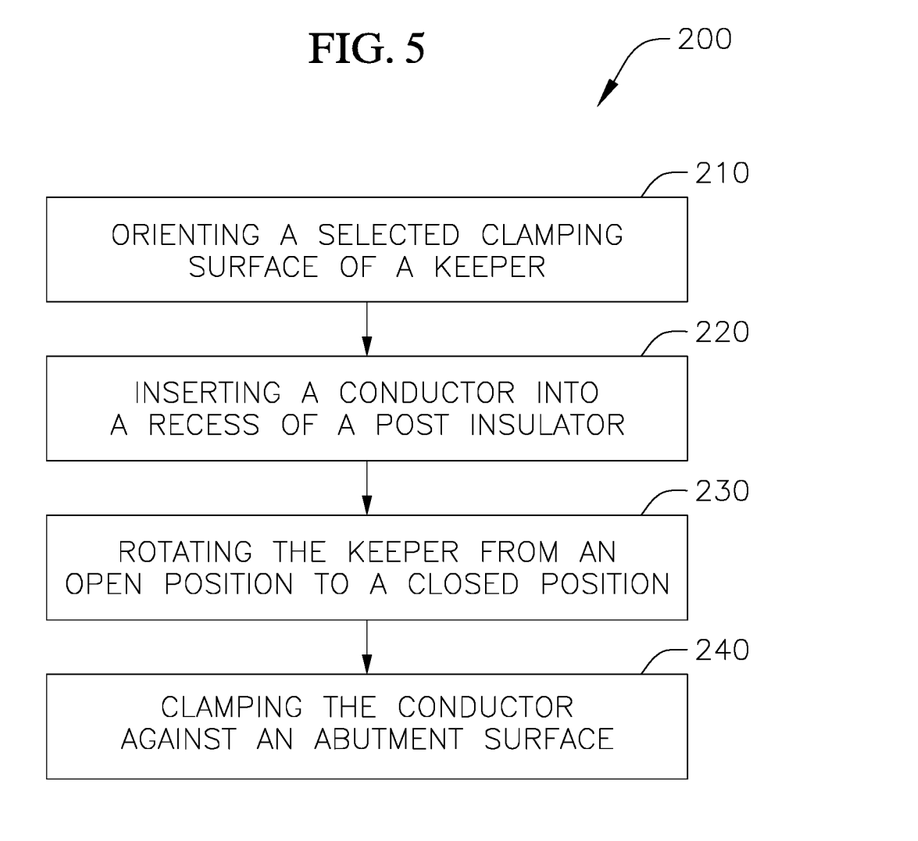
FIG. 5 is a flowchart showing tasks of a method of securing a conductor on a post insulator utilizing a post insulator keeper of the post insulator, according to an embodiment of the present invention.

With reference to FIG. 5, tasks of a method 200 of securing a conductor on a post insulator utilizing a post insulator keeper of the post insulator are shown. In an embodiment, for example, the conductor 20 may be secured on the post insulator 10 described above utilizing the keeper 140 by the method 200.

In an embodiment, the method 200 includes a task 210 of orienting a selected clamping surface of the keeper 140. That is, the task 210 may include arranging the keeper 140 on the case 100 to have an orientation in which one of the clamping surfaces 146 and 148 having a size corresponding to a size of the conductor 20 faces the abutment surface 104 such that the conductor 20 may be pressed against the abutment surface 104 by the one of the clamping surfaces 146 and 148. In an embodiment, a pair of the keepers 140 having the clamping surfaces 146 and 148 are arranged to have the above-described orientation.

The method 200 includes a task 220 of inserting the conductor 20 into the recess 102 of the case 100. The task 220 is performed with the keeper 140 in the open position. For example, the conductor 20 may be inserted into the recess 102 using a hot stick or other suitable tool, such as while the conductor 20 is energized. In an embodiment, the recess 102 is open toward an upper side, and the conductor 20 may be inserted into the recess 102 by being dropped into the recess 102 from the upper side. In another embodiment, rather than the task 220 being performed with the keeper 140 in the open position, the task 220 may be performed before the keeper 140 is arranged on the case 100 according to the task 210.

According to an embodiment, the method 200 further includes a task 230 of rotating the keeper 140 from the open position to the closed position. When the keeper 140 is in the closed position, the conductor 20 may be maintained or secured in the recess 102. In an embodiment, the keeper 140 may be rotated from the open position to the closed position using a hot stick or other suitable tool, such as while the conductor 20 is energized. In an embodiment, the keeper 140 may be rotated by inserting the tool into the eyelet 144 and applying a rotation force to rotate the keeper 140 about the rotation axis 130. The keeper 140 may be rotated by at least 90 degrees to the closed position, and the keeper 140 may be rotated such that the connection groove 152 receives the fastener 110 at the side of the recess 102 opposite the rotation axis 130. In an embodiment, the keeper 140 may be rotated from the open position to the closed position using the same tool that is used in the task 210 described above. In an embodiment, a pair of the keepers 140 arranged at opposite sides of the case 100 are rotated from the open position to the closed position.

In an embodiment, the method 200 further includes a task 240 of clamping the conductor 20 against the abutment surface 104 of the case 100. In an embodiment, the fastener 110 received in the connection groove 152 is threaded into the respective case opening 112 to a greater depth so as to press against the hook portion 154. As a result, the keeper 140 is pressed toward the recess 102, and the one of the clamping surfaces 146 and 148 presses the conductor 20 against the abutment surface 104. The fastener 110 received in the connection opening 142 may also be threaded into the respective case opening 112 to a greater depth so as to press against the base portion 141. In an embodiment, the fasteners 110 may initially be inserted into the case openings 112 to a lesser depth such that the keeper 140 may be freely rotated over the conductor 20 from the open position to the closed position. In an embodiment, the clamping task 240 may be performed using a pair of the keepers 140 at opposite sides of the case 100.

While in one embodiment, the method 200 of securing a conductor on a post insulator may include each of the tasks described above and shown in FIG. 5, in other embodiments of the present invention, in a method of securing a conductor on a post insulator, one or more of the tasks described above and shown in FIG. 5 may be absent and/or additional tasks may be performed. For example, the method may further include a task of mounting the post insulator to a transmission line pole or tower. Also, for example, the method may further include tasks of rotating the keeper 140 from the closed position to the open position, and removing the conductor 20 from the recess 102. Further, in the method 200 of securing a conductor on a post insulator according to one embodiment, the tasks may be performed in the order depicted in FIG. 5. However, the present invention is not limited thereto and, in a method of securing a conductor on a post insulator according to other embodiments of the present invention, the tasks described above and shown in FIG. 5 may be performed in any other suitable sequence.

Figure 6:
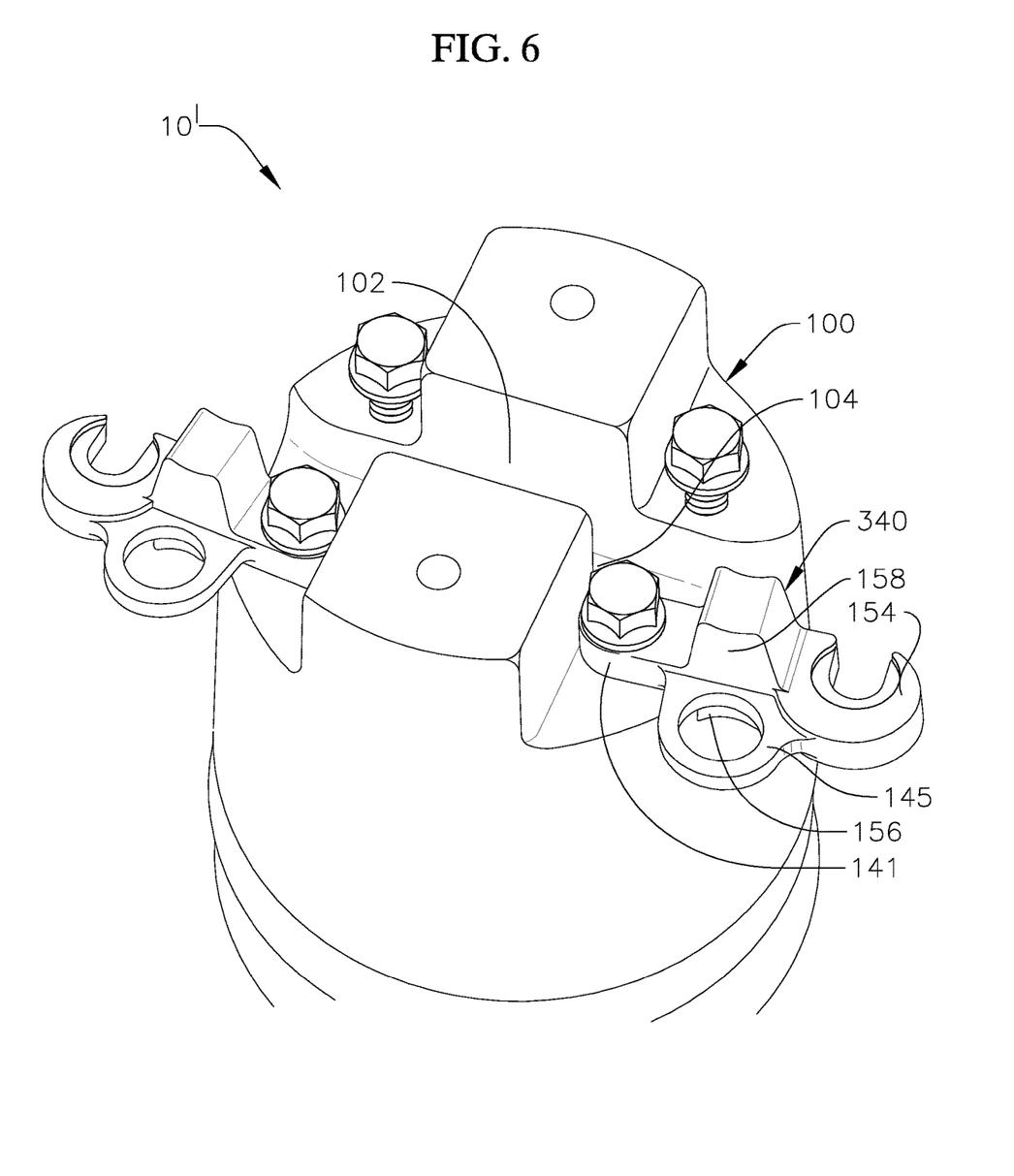
FIG. 6 is a partial perspective view of a post insulator showing a post insulator keeper of the post insulator in an open position, according to another embodiment of the present invention.
Figure 7:
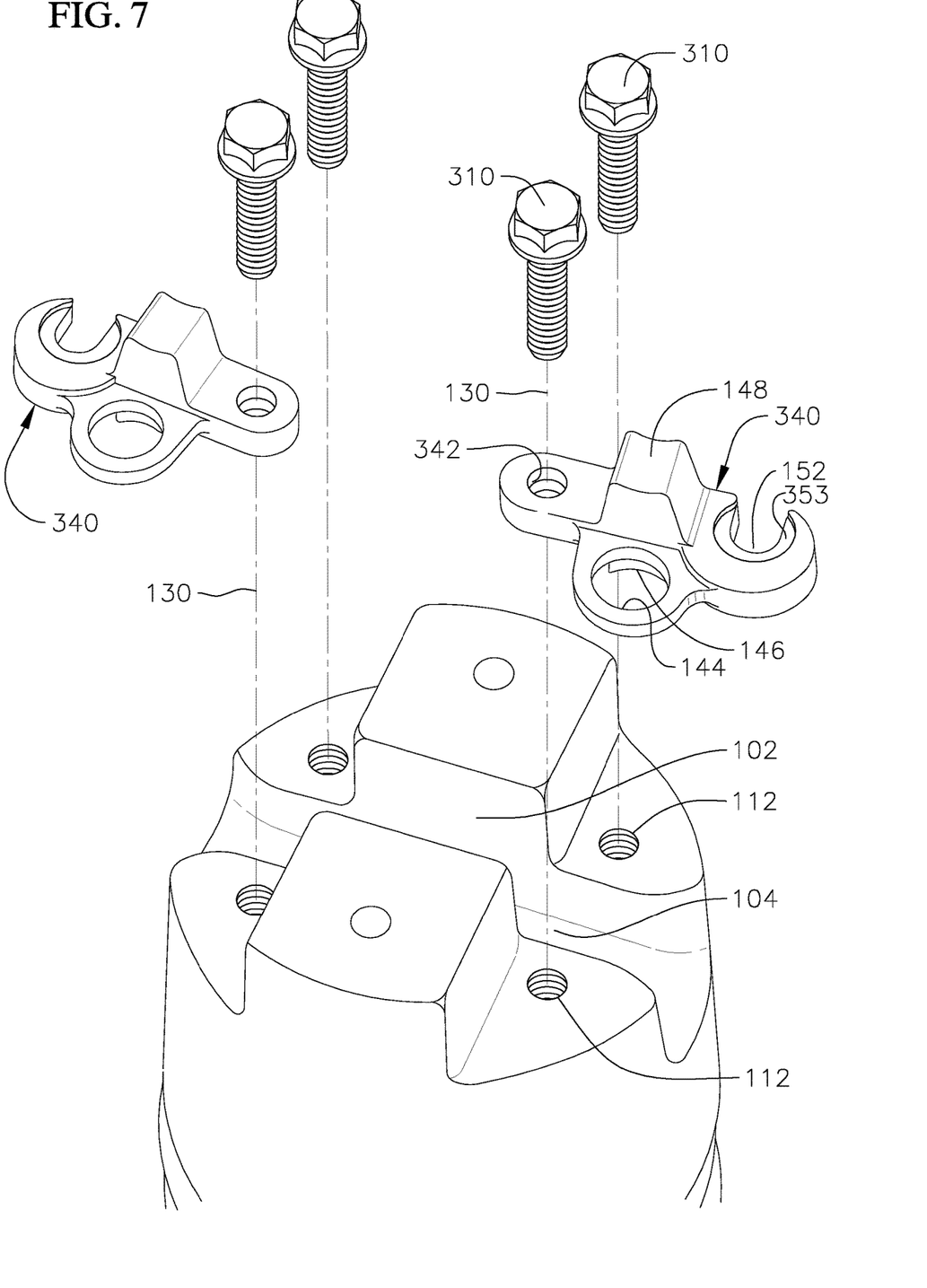
FIG. 7 is a partial exploded view of the post insulator of FIG. 6.
Figure 8:
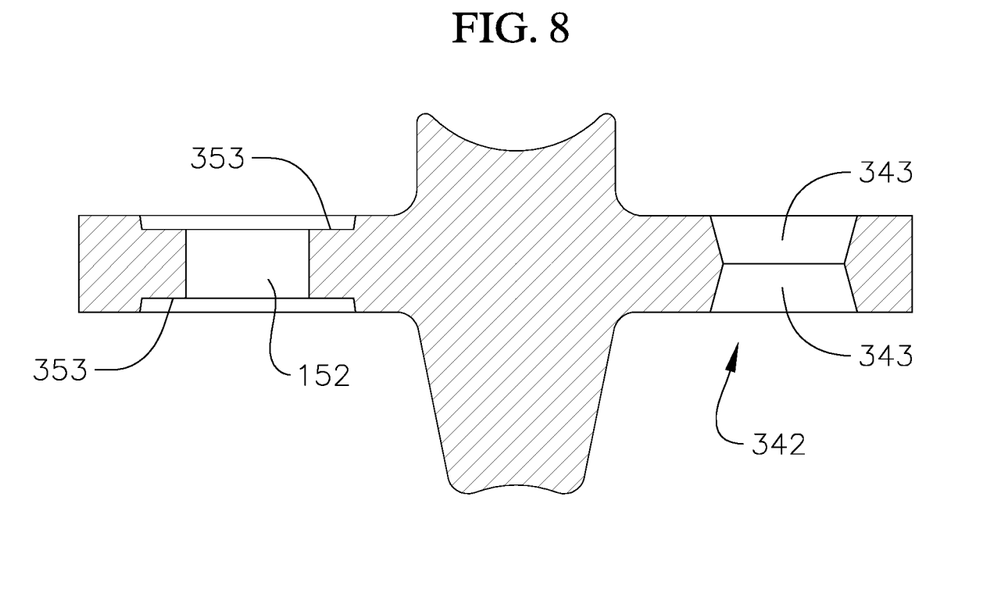
FIG. 8 is a cross-sectional view of the post insulator keeper of FIG. 6.
Figure 9:
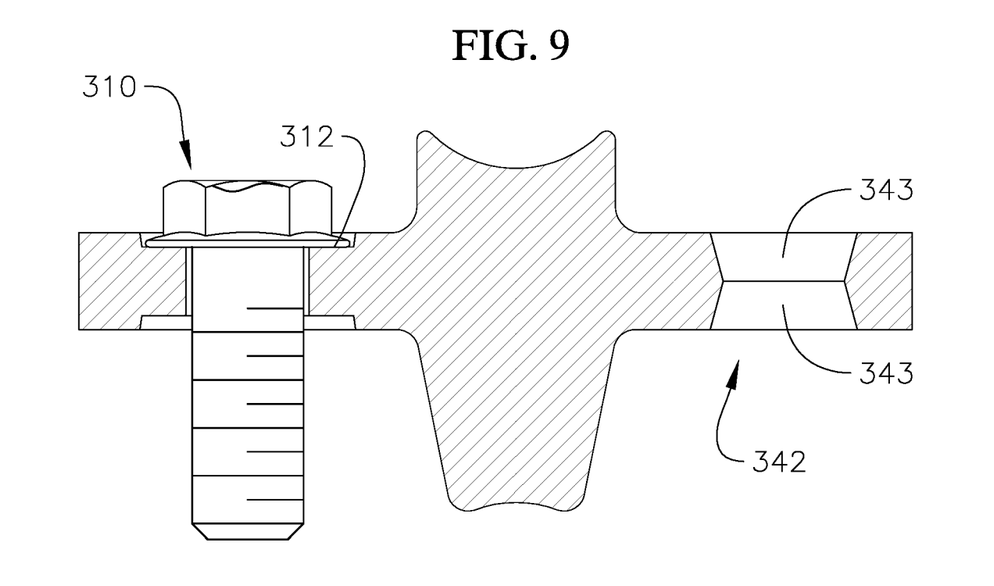
FIG. 9 is a cross-sectional view of the post insulator keeper of FIG. 6 with a fastener therein.

FIG. 6 is a partial perspective view of a post insulator showing a post insulator keeper of the post insulator in an open position, according to another embodiment of the present invention; and FIG. 7 is a partial exploded view of the post insulator of FIG. 6. FIGS. 8 and 9 are cross-sectional views of a keeper of the post insulator of FIG. 6. With reference to FIGS. 6 to 9, a post insulator 10' may be the same or substantially the same as the post insulator 10 described above, except for a keeper 340. According to an embodiment, the keeper 340 may be the same or substantially the same as the keeper 140 described above except for a connection opening 342 and a recess 353.

The keeper 340 may include the connection opening 342 similar to the connection opening 142 described above, except that the connection opening 342 is defined by inclined surfaces 343 at upper and lower sides. The inclined surfaces 343 may define conical portions and, in an embodiment, may be inclined relative to a longitudinal axis of the connection opening 342 by an angle of about 30 degrees. However, embodiments of the present invention are not limited thereto. For example, the inclined surfaces 343 may be inclined at an angle greater or less than 30 degrees. The inclined surfaces 343 allow the keeper 340 to swivel or pivot upward or downward, that is, relative to a longitudinal axis of the fastener 310 prior to tightening the fastener 310. This facilitates moving the keeper 340 over the conductor 20 to capture the conductor 20 and engaging the connection groove 152 on the opposite fastener 310. In an operation in which a hot stick is used, this swiveling of the keeper 340 may be particularly advantageous.

According to an embodiment, the keeper 340 includes recesses 353 surrounding the connection groove 152 at upper and lower sides thereof. The recess 353 may retain the fastener 310 therein upon tightening of the fastener 310 and may thereby prevent or substantially prevent the keeper 340 from rotating or "walking" during tightening of the fastener 310. In an embodiment, the recess 353 may have a depth of about 0.078 inches; however, embodiments of the present invention are not limited thereto.

In an embodiment, the fastener 310 may be a WHIZ-LOCK bolt (WHIZ-LOCK is a registered trademark of Maclean-Fogg Locknut Company Corporation, Chicago, Ill.). However, embodiments of the present invention are not limited thereto. The WHIZ-LOCK bolt has an integrated washer portion having serrations on a lower surface which may dig into the keeper 340, which may be made of aluminum, for example, and thereby function as a lock washer.

According to an embodiment, the method 200 of securing a conductor on a post insulator described above may be used with the post insulator 10' including the keeper 340. However, as discussed above, the keeper 340 may be swiveled due to the inclined portion 343 to more easily capture the conductor 20. Further, in an embodiment, the fastener 310 (e.g., a WHIZ-LOCK bolt) may be captured in the recess 353 such that the keeper 340 may be prevented or substantially prevented from walking as the fastener 310 is tightened.

Although the drawings and accompanying description illustrate certain exemplary embodiments of the present invention, it will be apparent that the novel aspects of the present invention may also be carried out by utilizing alternative structures, sizes, shapes, and/or materials in embodiments of the present invention. Also, in other embodiments, components described above with respect to one embodiment may be included together with or interchanged with those of other embodiments. Accordingly, persons skilled in the art and technology to which this invention pertains will appreciate that alterations and changes in the described structures and methods of operation can be practiced without meaningfully departing from the principles, spirit, and scope of this invention.

What is claimed is:

1. A post insulator comprising:
    an electrically insulative case comprising an abutment surface defining a recess; and
    a keeper rotatably coupled about a rotation axis to the case between an open position in which a conductor is receivable into the recess, and a closed position to maintain the conductor in the recess, the keeper comprising a clamping surface facing the abutment surface when the keeper is in the closed position to clamp a conductor against the abutment surface, the clamping surface facing in a direction in which the rotation axis extends.

2. The post insulator of claim 1, wherein the keeper comprises an eyelet configured to receive a tool to rotate the keeper between the open position and the closed position.

3. The post insulator of claim 1, wherein the keeper comprises a connection opening defining the rotation axis about which the keeper is rotatably mounted to the case.

4. The post insulator of claim 3, wherein the connection opening is defined by inclined surfaces at upper and lower portions thereof, the inclined surfaces being inclined relative to a longitudinal axis of the connection opening.

5. The post insulator of claim 3, wherein the keeper comprises an eyelet configured to receive a tool to rotate the keeper between the open position and the closed position, the eyelet being spaced apart from the connection opening.

6. The post insulator of claim 1, wherein the keeper is rotatably coupled to the case about the rotation axis, and the recess is a U-shaped recess having two sides extending in a same direction as the rotation axis.

7. The post insulator of claim 1, wherein the clamping surface has a radius of curvature to be in surface contact with a conductor in the recess.

8. The post insulator of claim 7, wherein the case comprises a connection fastener, and the keeper comprises a connection groove, and wherein, in the closed position, the connection fastener is received in the connection groove.

9. The post insulator of claim 8, wherein the connection fastener is configured to apply a force against the keeper in a direction toward the abutment surface to secure a conductor against the abutment surface via the clamping surface.

10. The post insulator of claim 9, wherein the keeper further comprises a recess surrounding the connection groove, the connection fastener being receivable in the recess to secure the conductor.

11. A post insulator comprising:
    an electrically insulative case comprising an abutment surface defining a recess; and
    a keeper rotatably coupled to the case between an open position in which a conductor is receivable into the recess, and a closed position to maintain the conductor in the recess, wherein the keeper comprises a first clamping surface facing a first direction and having a first curvature size, and a second clamping surface facing a second direction opposite the first direction and having a second curvature size different than the first curvature size, and wherein the keeper is removably mounted to the case such that either the first clamping surface or the second clamping surface is arrangeable to face the abutment surface based on a size of a conductor to be received in the recess.

12. A method of securing a conductor on a post insulator comprising an electrically insulative case comprising an abutment surface defining a recess, and a keeper rotatably coupled about a rotation axis to the case between an open position and a closed position, the keeper comprising a clamping surface facing the abutment surface when the keeper is in the closed position to clamp the conductor against the abutment surface, the clamping surface facing in a direction in which the rotation axis extends, the method comprising:
   inserting the conductor into the recess of the case with the keeper in the open position; and
   rotating the keeper from the open position to the closed position to maintain the conductor in the recess.

13. The method of claim 12, wherein the keeper is rotatably mounted to the case through a connection opening of the keeper, the connection opening defining the rotation axis, and wherein rotating the keeper comprises rotating the keeper about the rotation axis from the open position to the closed position.

14. The method of claim 12, wherein the keeper comprises an eyelet, and rotating the keeper comprises inserting a tool into the eyelet and applying a rotation force to the keeper using the tool.

15. The method of claim 12, further comprising clamping the conductor against an abutment surface of the case, the abutment surface defining at least one side of the recess.

16. The method of claim 15, wherein clamping the conductor comprises forcing the clamping surface of the keeper into surface contact against the conductor, the clamping surface being opposite the abutment surface.

17. The method of claim 16, wherein the case comprises a connection fastener, and the keeper comprises a connection groove, and wherein, in the closed position, the connection fastener is received in the connection groove.

18. The method of claim 17, wherein forcing the clamping surface of the keeper into surface contact against the conductor comprises applying a force against the keeper in a direction toward the abutment surface via the connection fastener.

19. The method of claim 12, wherein rotating the keeper comprises rotating the keeper using a hot stick while the conductor is energized.

20. The method of claim 12, wherein the keeper comprises a plurality of clamping surfaces having different curvature sizes, the plurality of clamping surfaces including the clamping surface, and the method further comprises arranging the keeper such that the clamping surface of the plurality of clamping surfaces faces the conductor, the curvature size of the clamping surface corresponding to a size of the conductor.

\* \* \* \* \*